United States Patent [19]
Chase

[11] 3,869,972
[45] Mar. 11, 1975

[54] FRYER
[75] Inventor: Bert Chase, Tampa, Fla.
[73] Assignees: Virginia Chase; Dorothy Miller; Ruby Paxton, all of Tampa, Fla.; part interest to each
[22] Filed: Nov. 5, 1973
[21] Appl. No.: 412,980

[52] U.S. Cl. .................. 99/410, 99/403, 99/408
[51] Int. Cl. ......................................... A47j 37/12
[58] Field of Search ............. 99/410, 330, 403–408, 99/416; 4/189, 195

[56] References Cited
UNITED STATES PATENTS

| | | | |
|---|---|---|---|
| 327,295 | 9/1885 | McFarland | 4/195 |
| 1,102,411 | 7/1914 | James | 4/189 X |
| 2,488,156 | 11/1949 | Bamberger | 99/330 UX |
| 2,695,947 | 11/1954 | Heerdt | 99/403 UX |
| 2,848,938 | 8/1958 | Klein | 99/403 X |
| 3,363,541 | 1/1968 | Anetsberger | 99/408 |
| 3,477,361 | 11/1969 | Bradshaw | 99/408 |
| 3,495,525 | 2/1970 | Piotrowski | 99/408 |
| 3,787,594 | 1/1974 | Palmason | 99/408 X |

Primary Examiner—Peter Feldman
Assistant Examiner—Arthur O. Henderson
Attorney, Agent, or Firm—Stein and Orman

[57] ABSTRACT

A cooking apparatus in the form of a deep-fat fryer comprising a housing having a cooking tank mounted therein wherein the tank comprises at least two cooking zones arranged in adjacent, fluid communicating relation to one another, while at least one of said zones is disposed lower than the other of said zones so as to maintain the higher of said zones at a substantially greater temperature. Shortening removal means is mounted within the tank and includes a fluid regulating means removably connected thereto so as to allow or prevent flow of shortening from the tank through a gate valve or like valving arrangement. A drain stand or shelf may also be connected in communicating relation to the tank.

9 Claims, 7 Drawing Figures

PATENTED MAR 11 1975
3,869,972
SHEET 1 OF 2
FIG. 1
FIG. 2
FIG. 3
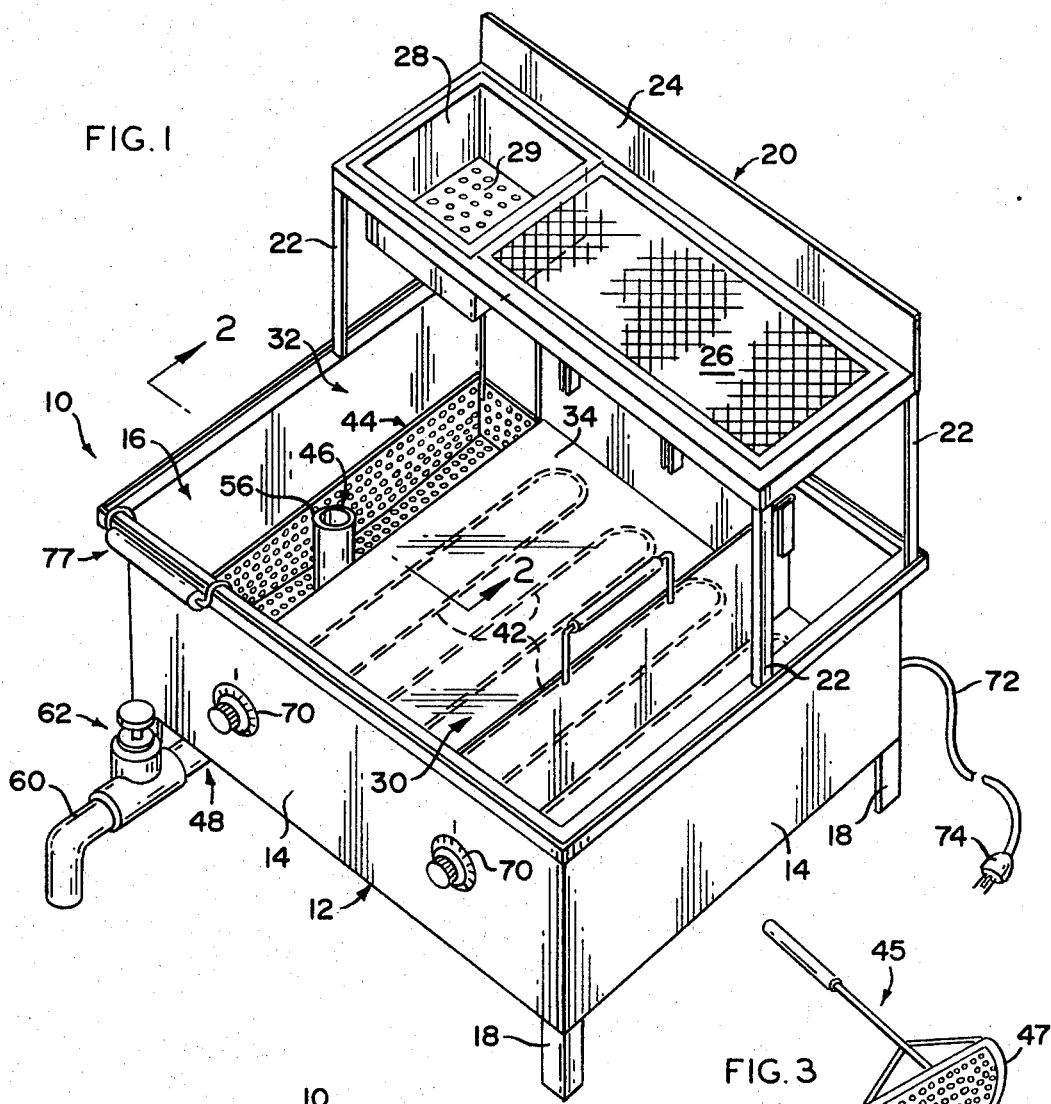
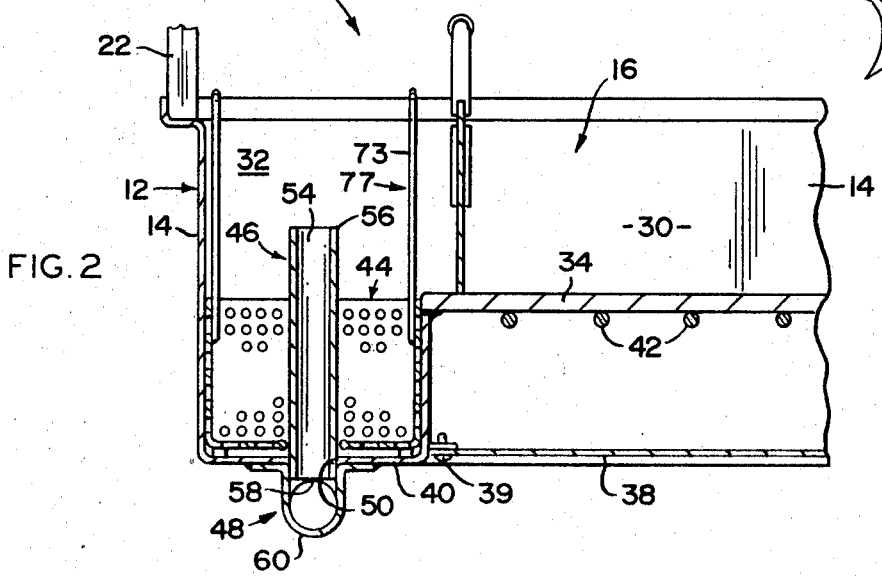

FRYER

BACKGROUND OF THE INVENTION

1. Field of the Invention

This invention relates to a deep-fat fryer type cooking apparatus having a plurality of zones in fluid communication with one another and oriented relative to one another and to a heating means so that the zones are maintained at different temperatures or within different temperature ranges.

2. Description of the Prior Art

Numerous cooking apparatus and devices of various designs are presently in existence and also commercially available to perform a wide variety of specific and general applications. Included in this wide variety of apparatus are structures specifically designed to fry various food products in a "deep" fat or shortening. Throught extensive utilization of this type of apparatus, there are obviously many problems and disadvantages which have developed. With the advent of the modern franchising system, and in particular the numerous "fast food" establishments brought into existence in recent years, there has been an increased demand for an efficient deep-fat fryer capable of being efficiently operated so as to produce a desirable food product upon completion of the cooking process. Such a cooking apparatus, however, must be relatively simple in structural design so as to reduce the initial cost while at the same time keeping maintenance expense and down time to a minimum.

A number of the cooking devices presently available in the prior art are disclosed in the following U.S. Pat. Nos. Schwedersky, 1,907,265; Levin, 2,053,568; Anetsberger, 2,061,533; Smith, 2,716,938; and Swisher, 3,218,959.

While a number of the structures disclosed in these patents are capable of a specific operation for which they were designed, a number of these structures may be considered overly complex and therefore costly.

Problems common to prior art structures include the efficient location of the heating means. A number of prior art structures have the heating means or heating elements located directly within the tank in which the fat or shortening is placed. If the heating element itself is in direct contact with this shortening, fire frequently develops because of overheating of the shortening to a temperature which causes its combustion. Cooking equipment suffering from these disadvantages often result in increased insurance rates for commercial application and more importantly a specific personal hazard for those utilizing the apparatus.

Another problem associated with cooking devices of this type is the occurrence of fat carbonization caused by particles being cooked too long a time causing a breaking down of the fat. When this occurs, these particles are further broken down into dust-like material and distributed throughout the fat. The particles further blend with the product being cooked giving it an off-color taste and reducing its palatability. To eliminate this problem, a desired cooking apparatus should comprise a "cool zone" provided in fluid or shortening communication with a normally "hot zone" maintained at proper cooking temperatures.

Another problem associated with prior art devices relates to the removal of shortening from the cooking tank after it has been used. Frequently, particles which gather in the bottom of the tank cause clogging of any removal means mounted on the tank interior. Accordingly, any cooking apparatus should ideally contain means to regulate flow of the shortening from the tank while at the same time preventing particles from clogging in the removal conduit or valving apparatus associated therewith.

Yet another problem associated with prior art devices is the location of standard or conventional heating elements on the side wall area of the tank in which shortening and products being cooked are placed. This side wall location causes the heat to move towards the center of the tank. As a result, in the conventional unit, the products are caused to float towards the center of the tank due to the current direction or flow of heat from the heating elements towards the center as set forth above. Therefore, it is clear that there is a need in the cooking industry for a cooking device having its heating elements located in such a manner as to evenly distribute the heat throughout the tank in which food products are placed therefore preventing movement of the product to a central location where fusing may take place.

SUMMARY OF THE INVENTION

This invention relates to a cooking apparatus primarily known as a deep-fat fryer which may be operated or have heating means attached thereto activated by electricity or any other form of applicable energy, gas or steam. While on the preferred embodiment, it is recognized that the cooking apparatus is electrically activated and heated, any of the above-noted means of powering the device could be utilized and still be maintained within the scope of the present invention.

The cooking apparatus itself comprises a housing having defined therein a cooking tank which itself includes a plurality of heating zones. More specifically, the heating zones include at least a first aand second zone arranged in adjacent relation to one another and configured and disposed to be in fluid communication with one another also. The first zone comprises the major portion of the cooking tank means and includes a planar base member mounted within the housing and positioned in adjacent cooperating relation to the heating means serving to heat the interior of the tank and the shortening or cooking fat or oil contained therein.

The second zone may be referred to as the "cool zone" in that it comprises a base oriented somewhat lower relative to the base of the housing than the base of the first zone. In addition, the base of the second zone and the general disposition of the zone itself is somewhat spaced from the heating means and specifically positioned a farther distance from this heating means than the base of the first zone. Accordingly, shortening contained in the second zone is maintained at a somewhat cooler temperature than the shortening or cooking fat primarily associated with the first zone and its base. While it is obvious and well accepted that the shortening can be maintained at a number of specific temperatures within predetermined ranges in order to efficiently cook various food products, the present invention is designed, by virtue of the structural relations of the first and second zones, to maintain the cool zone, or second zone, normally about 200° fahrenheit cooler than the temperature in the first zone. More specifically, the temperature in the cooking area, or first zone, is maintained at approximately 300° fahrenheit wherein the temperature in the cool zone is maintained at approximately 100° to 150° fahrenheit. Again, the specific temperature ranges are not critical and, of course, would vary dependent upon the food product being cooked or the specific application of the cooking apparatus itself. However, the orientation of the two cooking zones is to accomplish the maintenance of the "cool zone" at a desired temperature somewhat lower than the temperature maintained in the first zone which is primarily used for cooking of the food product.

A fluid regulating means in the form of a stand pipe which includes a substantially elongated conduit having oppositely disposed open ends is removably mounted or attached to the removal means. The stand pipe is positioned such that one of its open ends engages a removal means at least partially formed within the base of the second zone. The opposite end is disposed due to its elongated configuration, above the surface of the shortening within the tank means. This, of course, prevents fluid flow in that the shortening or liquid fat can in effect not reach the exiting aperture of the removal means. Fluid flow can therefore be regulated to and from the tank, as long as the valving means is open, merely by positioning and removal of the stand pipe.

An apertured basket is located in the second zone and rests on the base thereof. An aperture is formed in the base of the basket in alignment with the aperture and the base of the second zone itself. By virtue of these aligned apertures, the stand pipe can be fitted into the removal means comprising the base aperture in the manner described above. When the stand pipe is not so positioned, a closure in the form of a hinged cap can be fitted or attached to the basket so as to close off in fluid sealing engagement, the aperture both in the basket and the base of the "cool zone" or second zone.

A chain or like means may be attached to the pivoted cap so as to open it allowing the stand pipe to be positioned therein.

Other structural features associated with the basket and "cool zone" are a handle means specifically configured to engage the upper peripheral portions of the tank whereby the basket may be easily removed.

A drain stand or shelf is connected to the housing in fluid communicating, overhanging relation to the tank means. In addition, the stand includes an apertured base whereon various food products, just being cooked, may be temporarily positioned for draining upon the apertured base. Excess shortening clinging to the surface of the freshly-cooked products merely drains therefrom back into the shortening contained within the tank, reducing fat loss.

The drain stand or shelf further comprises a pan having an apertured base positioned in recessed relation to the shelf and removably mounted thereon. A perforated pan is used to hold and drain large particles of batter and debris that break loose from the cooked product. These large particles may be removed from the shortening within the cooking tank with a perforated ladle or other similar means and are thereby placed in the pan for draining and disposal.

Yet another embodiment of the drain stand or shelf comprises a solid base angularly oriented or slanted relative to the cooking tank such that objects and shortening thereon are naturally inclined towards the frontmost edge of the stand or shelf. This frontmost edge may be apertured to allow shortening draining therefrom to fall back into the tank.

Additional structural features of the cooking device of the present invention includes a removable divider movably mounted within the tank and comprising an elongated plate having handle means formed thereon. Brackets are appropriately positioned and connected to the inner surface of the side wall substaantially adjacent the first zone of the tank wherein the divider plate may be positioned as desired so as to define segmented compartments within the tank itself.

The present invention may also include a scraper means for collecting or scraping the interior of the tank. The scraper means itself may comprise a curvilinear scraper blade constructed from a perforated material. This perforated portion of the blade reduces turbulence as the scraper passes through the fat or shortening within the fryer and reduces the fat being stirred up and the sediment therein being dispersed so as to make collection of the sediment difficult.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description taken in connection with the accompanying drawings, in which:

FIG. 1 is a perspective view showing both the interior and exterior of the housing and accompanying structural element which comprises the cooking apparatus of the present invention.

FIG. 2 is a sectional view taken along line 2—2 of FIG. 1 showing details of the first zone, second zone, and shortening removal means.

FIG. 3 is a detailed view of the scraper means.

Similar reference characters refer to similar parts throughout the several views of the drawings.

DETAILED DESCRIPTION OF THE PREFERRED EMBODIMENT

Figure 4:
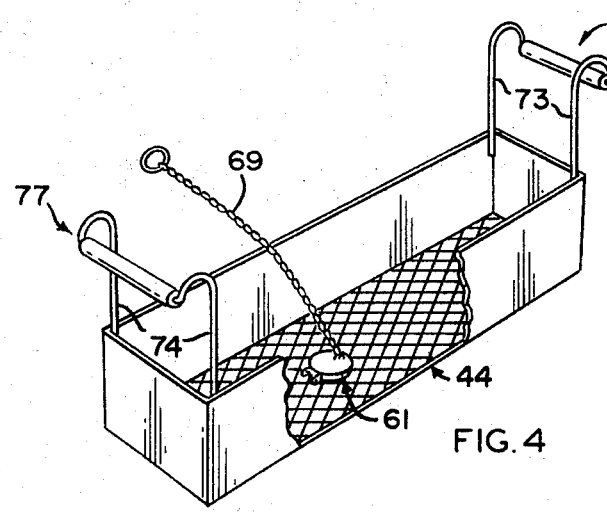
FIG. 4 is a perspective view of the basket designed to be placed within the second zone of the cooking device.

This invention relates to a cooking apparatus generally indicated in FIG. 1 as 10 and comprising a housing 12 having a plurality of side walls 14 which define a cooking tank generally indicated as 16 on the interior of the housing. A plurality of supporting legs 18 may be located on the undersurface of housing 12 as needed to properly support the cooking apparatus on any given surface. The tank 16 is specifically configured to hold liquid shortening when the cooking apparatus is in its operative state.

Other structural features of the device include a drain stand of shelf generally indicated as 20 which may be removably attached to the upper portion of housing 12 by support arms 22 or any applicable support means. As shown, the drain stand comprises a backboard 24 attached adjacent to an apertured base 26 which is disposed in overhanging relation to the tank 16. This permits excess shortening or fat contained on the cooked food product to drain therefrom, through the apertured base 26 and fall back into the tank 16 for reuse. A container or the like 28 may similarly be mounted on the stand 20 for storage of large cooked waste products retrieved from the cooking tank 16. The container 28 may include a base having a plurality of apertures 29 formed therein so that fat contained on the large cooked waste products may pass through the apertures into the cooking tank for reuse.

The tank itself comprises a plurality of heating zones including a first zone generally indicated as 30 and a second zone generally indicated as 32. First zone 30 includes a base means 34 including a planar sheet of metal or like heat conductive material which extends upwardly from the under surface 38 of housing 12. Similarly, second zone 32 comprises a base means 40 which may be integral with under surface 38 or separate therefrom. Irrespective of its specific construction, base 40 is located below base 34 of the second zone relative to the undersurface 38 of the housing 12 for the reasons to be described in detail hereinafter. Heating means including a plurality of heating elements 42 are mounted within the housing substantially adjacent to or in cooperative engagement or relation with base 34. By virtue of this disposition of the heating means and/or elements 42 relative to base 34, the main cooking area of the apparatus takes place in the first zone by virtue of the fact that base 34 is maintained at a substantially higher temperature than base 40 of the second zone. This particular construction automatically defines the second zone as a "cool zone." By virtue of its spaced distance from heating means 42 and its lower disposition relative to base 34, there will be less heat concentrated in the lower part or the major portion of heating zone 32. This is also aided by the fact that the heat accumulated in tank 16 will tend to rise thereby allowing the temperature within the lower portions of the "cool zone" or second zone 32 to be maintained substantially less than that in the first zone.

Additional structure of the present invention comprises the heating elements 42 being located directly in the planar element 34 and/or integrally attached thereto so as to become an integral part thereof.

Again with specific reference to FIG. 2, undersurface 38 may be removably connected to the housing by means of a connector element generally indicated as 39. By virtue of this arrangement the undersurface member 38 may be openned or removed to provide access to the interior of the housing or tank 14 and access further to the heating elements 42.

Strainer means 44 which may be in the form of a removably positioned or mounted, apertured basket is mounted within the second zone about and in cooperative relation with fluid regulating means generally indicated as 46 and shortening removal means generally indicated as 48. In operation, particles accumulating on base 34 or in the remainder of tank 16 may be scraped off and deposited in strainer basket 44. These particles may be removed and passed into strainer basket 44 through the use of the scraper generally indicated as 45 including a generally arcuate-shaped blade 47 having a plurality of apertures 49 formed therein. As explained above, these apertures reduce the turbulence of the fat as the blade passes therethrough. The sedimentation is therefore more readily gathered than if the blade were not apertured. Removal of the basket will remove the major portion of these particles. However, if the particles are too small and by virtue of their dimensions pass through the apertures defining the basket 44, they will be collected on the base 40 of the second zone.

It is important for proper operation and to eliminate clogging of the removal means 48 to prevent these particles from indiscriminaately passing into the shortening removal means. Accordingly, the fluid regulating means in the form of stand pipe 54 is removably mounted in overflow aperture 50 in the base 40 of the second or "cool zone." The one end of stand pipe 54 is correspondingly configured to telescopicaally fit within and be removably connected to the aperture 50 as shown in FIG. 2. The fluid regulating means 46 in the form of elongated stand pipe 54 further includes oppositely disposed open ends 56 and 58 respectively. As shown, end 58 is associated with overflow aperture 50 such that the opposite end 56 is disposed above the surface level of the shortening contained within the tank 16. By virtue of this configuration and orientation of the stand pipe 54, shortening and various particles remaining in the tank are prevented from flowing into the aperture 52 and through the conduit 60. A valving apparatus 62 which may include a gate valve or like means is mounted in the flow path of conduit 60 and will serve to allow or prevent flow of the shortening from tank 16 to disposal when stand pipe 54 is removed.

Figure 5:
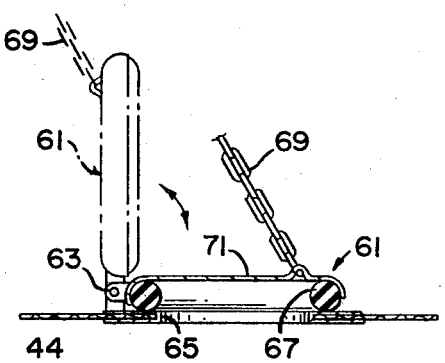
FIG. 5 is a sectional view of the cap structure also shown in FIG. 4.
Figure 6:
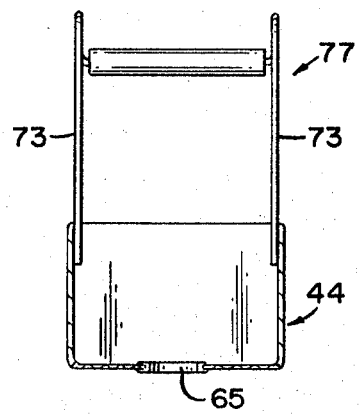
FIG. 6 is a sectional view showing the interior of the basket structure of FIG. 4.

As shown in FIGS. 4 and 5, the basket 44 has connected thereto a cap structure 61 pivotally connected by pivot connection 63 (FIG. 5) an aperture 65 is formed in the base of the basket 44 in alignment with aperture 50 formed in the base of the "cool zone" 40. By virtue of this alignment, the stand pipe 54 may pass through aperture 65 and into overflow aperture 50 in the base as clearly shown in FIG. 2. When the stand pipe 54 is not in this position the cap 61 is, of course, closed and includes a sealing ring 67 about its inner periphery which is specifically configured and disposed so as to maintain a liquid seal about the periphery of aperture 65. This, of course, prevents the fattening or shortening from flowing through the apertures and into the shortening removal means 48. A chain element or the like 69 may be mounted to the upper surface 71 of the cap 61 and have a sufficient longitudinal dimension so as to extend out of the basket 44. The purpose of chain 69 is obviously to pivot the cap 61 about pivot point 63 to an open position as shown in broken lines in FIG. 5. In this open position the stand pipe is easily inserted to the operative position as shown in FIG. 2. Further structural features of the basket 44 itself includes specifically configured handles 73 and 74 having a substantially U-shaped upper handle portion generally indicated as 77 designed to fit over the periphery of tank 16 and allow for easy removal of the basket.

Figure 7:
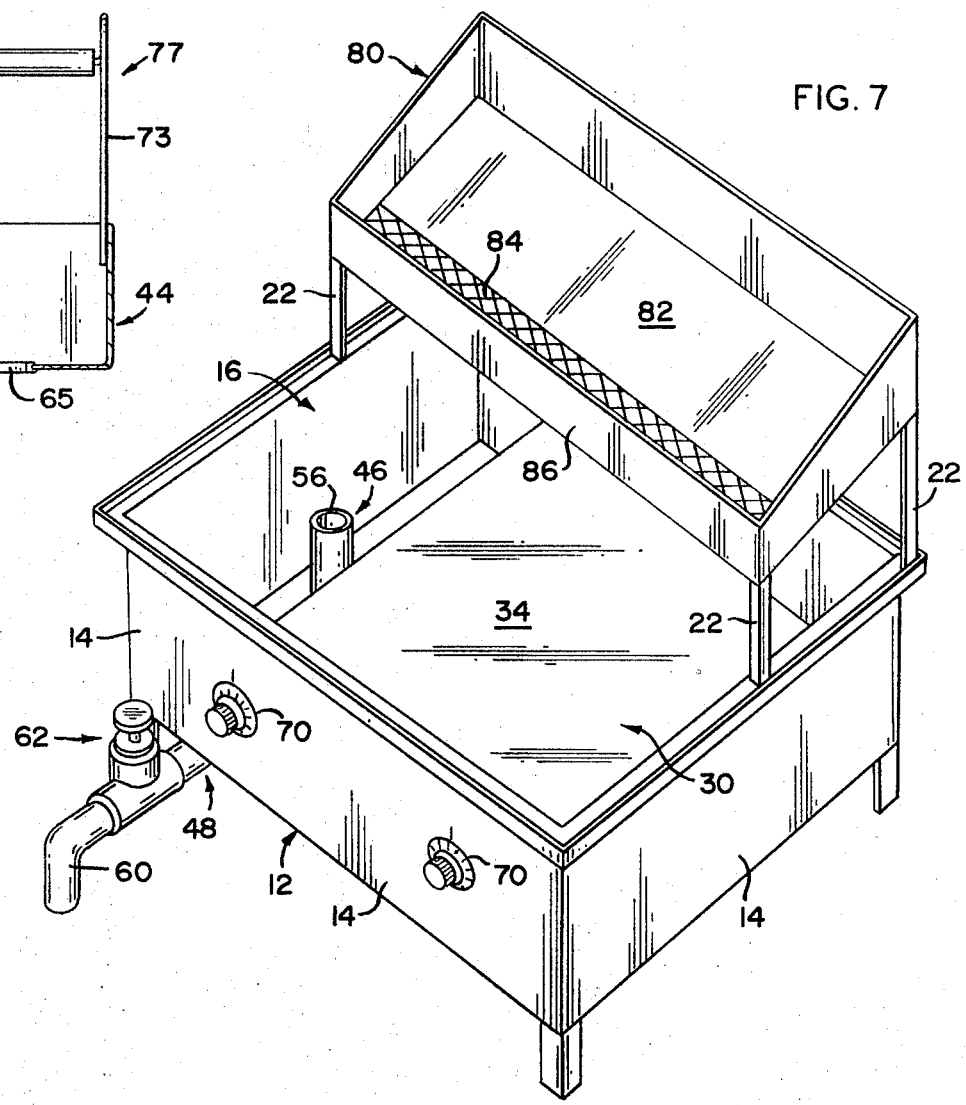
FIG. 7 is a perspective view of the cooking device having yet another embodiment of the drain shelf or stand connected thereto.

A furtther structural feature of the present invention is shown in FIG. 7 and includes a drain stand or shelf generally indicated as 80 and having a base 82 angularly oriented or tilted downwardly towards the tank 16. The frontmost edge of the base 82 is apertured as at 84 whereby food products and cooked batter, etc., placed on the base 82 of shelf 80 will have a tendency to slide toward the frontmost edge 86 wherein the fats accumulated thereon automatically passes back into tank 16 for reuse. As in the embodiment shown in FIG.

1, the shelf or stand 80 is supported by a plurality of support legs 22 in spaced relation to the housing 14 or tank 16 as shown.

Other structural features of the invention include control means 70 mounted on the housing in any applicable, efficient location. When electrical power is used to service the cooking apparatus, a conventional electrical conduit 72 and socket arrangement 74 may be connected to the heating means 42 for its proper operation.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features herein described, and all statements of the scope of the invention which, as a matter of language, might be said to fall therebetween.

Now that the invention has been described, what is claimed is:

1. A cooking apparatus primarily designed for cooking food products in shortening material, said apparatus comprising: a housing, cooking tank means mounted on said housing and configured to contain shortening therein, said tank means comprising a plurality of heating zones, including at least a first and second zone disposed in communicating relation with one another, both said first and second zones mounted within said tank means in substantially adjacent relation to one another and each comprising base means, said base means of said first and second zone disposed in substantially stepped relation to one another, wherein said base means of said second zone is disposed lower than said base means of said first zone, heating means disposed in substantially contiguous relation to said base means of said first zone and out of direct fluid contact with the interior of said tank means, said heating means further disposed in substantially spaced relation to said second zone, whereby the temperature in said first zone is maintained at a substantially higher temperature than in said second zone; shortening removal means mounted on said base of said second zone in fluid communication with said fluid tank means, flow regulating means removably attachable to said shortening removal means and configured to regulate the flow of shortening from said tank, seal means removably attached in sealing engagement with said shortening removal means, said flow regulating means comprising a stand pipe including an elongated conduit having oppositely disposed open ends, one of said ends removably engaging said shortening removal means and the opposite end oriented in spaced relation thereto adjacent the surface of the shortening in said tank means, said seal means disposed in non-sealing engagement with said removal means when said stand pipe is connected thereto, whereby the removal of shortening adjacent said base of said second zone is prevented.

2. A cooking apparatus as in claim 1, further comprising strainer means removably mounted within said second zone adjacent said base thereof, said strainer means comprising an aperture disposed and configured in cooperative relation to said flow regulating means and said seal means, said stand pipe connected to said shortening removal means through said aperture, whereby removal of said strainer means relative to said base of said second zone and said stand pipe is permitted without removal of said stand pipe.

3. A cooking apparatus as in claim 1 further comprising a drain shelf connected to said housing adjacent said tank means.

4. A cooking apparatus as in claim 3 wherein said drain shelf comprises an apertured base means disposed in spaced communicating relation to said tank means.

5. A cooking apparatus as in claim 4 wherein said drain shelf comprises a container means removably mounted thereon, said container comprises an apertured base.

6. A cooking apparatus as in claim 3 wherein said drain shelf comprises a base means angularly oriented relative to said cooking tank means, whereby objects placed thereon will tend to move towards the foremost edge thereof.

7. A cooking apparatus as in claim 6 wherein said drain shelf comprises a solid portion and an apertured portion, said apertured portion comprising at least a portion of the frontmost edge of said drain shelf relative to said tank means.

8. A cooking apparatus as in claim 1 wherein said heating zones comprise a plurality of second zones defined within said tank means, each of said second zones disposed in fluid communication with said first zone.

9. A cooking apparatus as in claim 8 wherein said heating zones comprise a plurality of first zones formed within said tank means and disposed in fluid communication with at least one of said second zones.

* * * * *